United States Patent
Storch et al.

(10) Patent No.: US 6,648,512 B1
(45) Date of Patent: Nov. 18, 2003

(54) SLIDE BEARING AND METHOD FOR THE PRODUCTION THEREOF

(75) Inventors: Thomas Storch, Bruhl (DE); Heinrich Wagner, Rauenberg (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 44 days.

(21) Appl. No.: 09/980,072

(22) PCT Filed: Sep. 1, 2000

(86) PCT No.: PCT/EP00/08542

§ 371 (c)(1),
(2), (4) Date: Nov. 28, 2001

(87) PCT Pub. No.: WO01/21916

PCT Pub. Date: Mar. 29, 2001

(30) Foreign Application Priority Data

Sep. 17, 1999 (DE) .......................................... 199 44 674

(51) Int. Cl.[7] ................................................ F16C 17/02
(52) U.S. Cl. ........................ 384/275; 384/296; 384/396
(58) Field of Search ................................. 384/275, 296, 384/396, 129, 294

(56) References Cited

U.S. PATENT DOCUMENTS 4,914,332 A * 4/1990 Borcherding et al. ....... 384/275

FOREIGN PATENT DOCUMENTS

| DE | 84 34 089 | 2/1985 |
| DE | 43 12 418 | 10/1994 |
| DE | 44 47 046 | 7/1996 |
| DE | 39 22 052 | 1/1997 |

* cited by examiner

Primary Examiner—Lenard A. Footland
(74) Attorney, Agent, or Firm—Young & Basile, PC

(57) ABSTRACT

The invention relates to a slide bearing comprising with a bearing opening (4) pertaining to a hinge-housing component (2) and a flange bearing box (6) pressed into said bearing opening (4), whereby a bearing pin (26) can be inserted and rotated therein. Said flange bearing box (6) has a crimped projection (50) which projects radially inwards in the direction of the periphery. In order to create a slide bearing which can be preassembled, said slide-bearing is formed such that said crimped projection (50), when viewed from a longitudinal section of the box forms as a curved region (52) in the wall of said flange bearing box (6) in the vicinity of the axial end of the bearing opening (4) and said curved region (52) projects into the flange (16) of the box (6) in such a way that a space (h) is created between the opening (4) and of the bearing outer side which faces the flange bearing box (6) in the region of the curved profile prior to insertion of the bearing pins (26). The curved region (52) of the flange bearing box (6) can be radially deformed radially in an outward direction.

6 Claims, 4 Drawing Sheets

SLIDE BEARING AND METHOD FOR THE PRODUCTION THEREOF

BACKGROUND

The invention relates to a slide bearing comprising a hinge housing component having a bearing opening and a flange-bearing bushing pressed into the bearing opening, into which a bearing pin can be inserted and pivoted therein, where the flange-bearing bushing has a crimped protrusion projecting radially inward along the periphery.

The term 11 hinge housing component 11 is to be understood in the broadest sense. It can be a hinge or articulated arm which interacts with another articulated arm or hinge arm and on which a component to be swung, for example, an automobile door, can be attached. A stationary hinge plate or one attached to a piece of equipment which has a bearing opening to insert a bearing pin can also act as a hinge housing component. The bearing pin itself can be already tightened or be tightened down later to an additional hinge housing component, or with an object opposite the first one which is to be swung.

A slide bearing of this type is known from DE 84 34 089 U1. In the case of this slide bearing, a hinge pin is secured against falling out in the axial direction as explicitly stated at a location inaccessible from the outside by means of an engagable end face of a flange-bearing bushing. The engagable end face of the flange-bearing bushing would correspond to the crimped projection. It is not possible to loosen the bearing pin subsequently.

With DE 39 22 052 A1 the proposal had already been made to configure a maintenance-free slide bearing for an automobile door hinge such that the flange-bearing bushing has a corrugated shape, which is stamped into the sliding surface. The intention is to be able to seat the bearing pin with as little free play as possible in the flange-bearing bushing. Production of this slide bearing is intricate, and, when the bearing pin is inserted, the corrugated profile becomes plastic, specifically, it is deformed under shear load. The sliding surface is destroyed and the service life of the slide bearing is unsatisfactory. This concept failed to gain acceptance.

SUMMARY

The object of the present invention is to improve a slide bearing of the type described above with the aim of being able to insert the bearing pin into the already pressed-in flange bearing bushing, prior to assembly of the components forming the hinge, and retain it there captive, so that virtually one hinge half can be handled together with the bearing pin.

This object is fulfilled by means of a slide bearing of the aforementioned type, which is characterized in that the crimped projection is formed by a curved area of the flange-bearing bushing wall in the area of one axial end of the bearing opening, when observed in the longitudinal section of the bushing, and the curved area terminates in the flange of the bushing, in such a way that, before the insertion of the bearing pin, a clearance (h) is created between the bearing opening and the outside of the flange-bearing bushing facing it, and the curved area of the flange-bearing bushing can be deformed outwards in a radial direction.

As a result of the flange-bearing bushing pressed into the bearing opening having the inward protruding projection around the radius, which is preferably elastically deformable radially outwards, a clearance-free slide bearing or seating of the bearing pin in the flange-bearing bushing can be achieved on the one hand when the bearing pin is inserted; on the other hand, when the bearing pin is inserted into the flange-bearing bushing, it is a pinch fit in the flange-bearing bushing. The hinge housing component can therefore be warehoused, transported and brought to final assembly in a more or less pre-assembled state. As a result, assembly on site can be designed to be considerably more efficient. The cost savings are considerable. It must be pointed out that the shape of the crimped projection in the form of the curved profile of the flange-bearing bushing is selected in such a way that the aforementioned clearance between the bearing opening of the hinge housing component and the outer wall of the flange-bearing bushing is preferably closed in the curved area following insertion of the bearing pin, meaning that the flange-bearing bushing contacts the bearing opening with its outer surface, which is once more cylindrical.

In a further development of the inventive concept, the crimped projection is formed in the area of one axial end of the bearing opening. Preferably this is the only crimped projection on the flange bushing. When the bearing pin is inserted from the opposite side, it is brought over a considerable axial distance and can then slide up against the curved portion and push it radially outward.

The aforementioned development proves to be particularly advantageous when the flange-bearing bushing is a double flange bushing, and the crimped projection provided in the area of one axial end of the double flange bushing terminates in the flange there. To this extent it proves to be advantageous if one flange of the flange-bearing bushing is located so that it can slide against a surface area of the hinge housing component or of an interposed component surrounding the bearing opening. In this way, when a bearing pin is inserted into the flange-bearing bushing, and with the accompanying radial expansion of the crimped projection, the flange slides outward in a radial direction.

As was already mentioned initially, it proves advantageous if the slide bearing comprises a pre-assembled hinge housing component, into whose bearing opening a flange-bearing bushing is pressed, with the bearing pin retained captive therein. The term "captive" is not to be understood in the sense that the bearing pin could not be pressed out of the flange-bearing bushing again in the opposite direction to its insertion. Rather, it is a pinch fit, or interference fit, in the bearing opening as a result of the radial deformation of the curved area of the flange-bearing bushing, so that it does not fall out of the bushing inadvertently and unintentionally during normal handling of the hinge housing component.

The invention also relates to a procedure for the production of a slide bearing of the type covered by the invention. The flange-bearing bushing which is inserted into the bearing opening from one side is accordingly pushed, pressed or upset in the longitudinal direction. This creates the curved enlarged shape which forms the crimped projection.

To do this it proves to be advantageous during this axial pushing, pressing or upsetting for a mandrel to be inserted not just a little way into the flange-bearing bushing, but to be passed through the flange-bearing bushing. The mandrel preferably has an offset outer surface. The curved profile of the bushing wall is created in the transition area from radially wider to radially narrower area of the outer surface of the mandrel. If this mandrel is passed through the opening, it can be carried on the opposite side, possibly in an opening of the die component by means of which the flange is pressed against the surface of the hinge housing component.

Advantageously the axial upsetting of the cylindrical part of the flange-bearing bushing is performed at the same time by the mandrel or by the motion of introducing the mandrel. In a further preferred embodiment of the procedure a second flange is formed during the axial upsetting of the cylindrical part of the flange-bearing bushing.

It proves furthermore to be advantageous if the mandrel used for this procedure is provided with a press surface running parallel to the flange surface to be created, and if the cylindrical area of the mandrel outer surface is curved where it meets this press surface, so that the end face of the cylindrical part of the flange bushing is guided by means of this curved section as far as a radial external stop, and as a result the upsetting of the cylindrical part of the flange bushing is achieved.

BRIEF DESCRIPTION OF THE DRAWING

Additional features, details and advantages of the invention can be seen from the appended patent claims and from the graphical representation and subsequent description of a preferred embodiment of the inventive slide bearing and the production thereof. The drawing includes:

DETAILED DESCRIPTION

Figure 1:
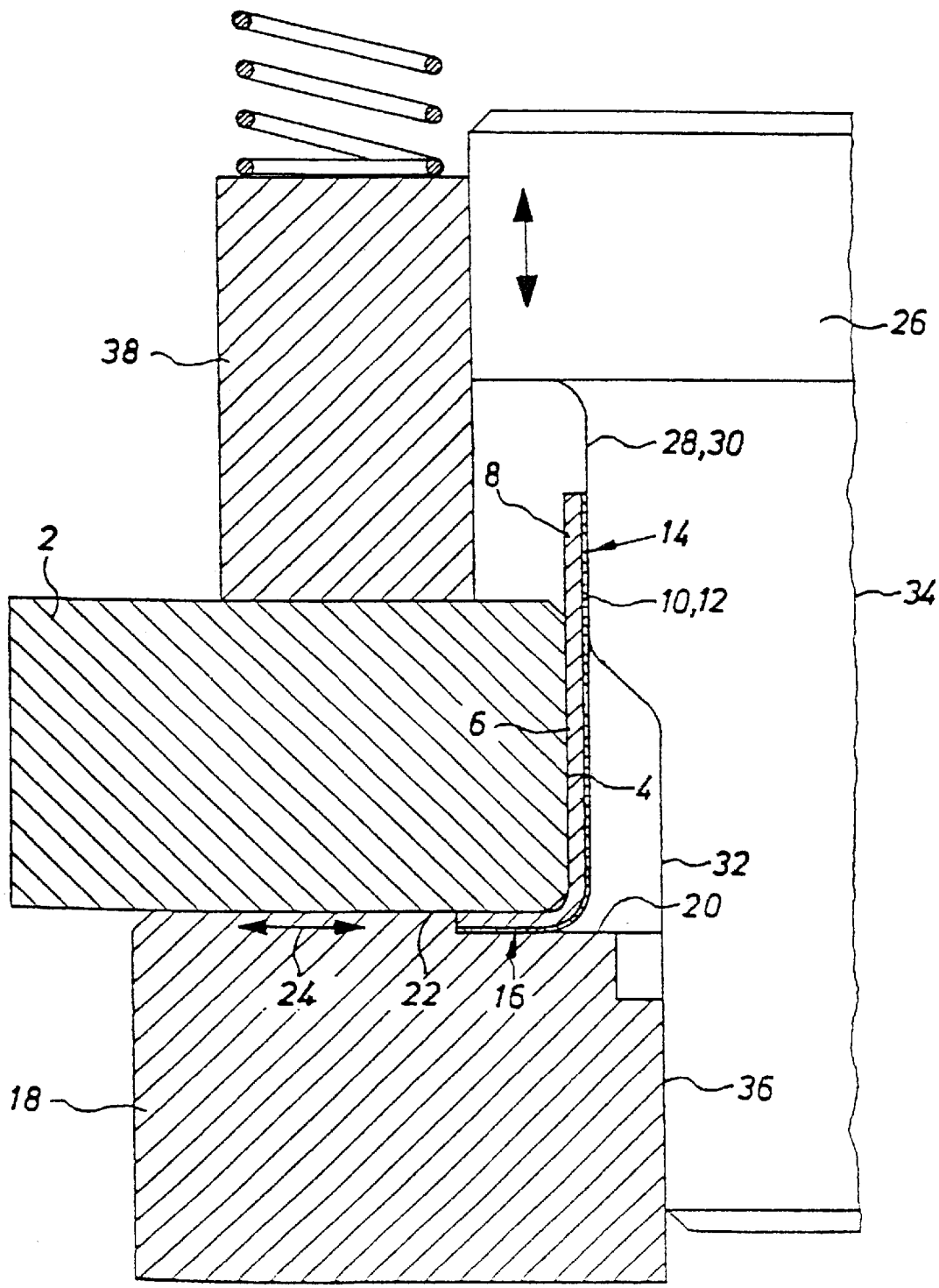
FIGS. 1 to 4 show different stages during the production of a slide bearing under the invention.

FIG. 1 shows a half-section drawing of an inventive slide bearing. The slide bearing comprises a hinge housing component 2 with a bearing opening 4 and flange-bearing bushing 6 pressed into it. The bearing bushing 6 is made from a steel-plastic-composite material. A porous bronze layer is sintered onto a steel backing 8, and a plastic slide bearing mixture 12 on a PTFE base is introduced into the pores of the bronze layer 10. The flange-bearing bushing 6 comprises a cylindrical part 14 and a first flange 16. The flange-bearing bushing 6 is pressed into the bearing opening 4. The flange 16 is held by means of a die press 18, with a press bearing surface 20 matching the flange, against a hinge housing component surface 22 which is adjacent to the opening 4. As a result, the flange 16 is held fast in the direction of the double arrow 24 as well, that is to say, in the surface plane direction of the surface 22. A mandrel 26 is inserted into the opening of the flange-bearing bushing 6. The mandrel 26 comprises an offset cylindrical surface 28 with one area 30 which is larger and one area 32 which is smaller in diameter. The die press 18 comprises an opening 36 aligned with the longitudinal direction 34 of the slide bearing, into which opening the smaller diameter area 32 of the mandrel 26 extends and is carried so that it can move. The mandrel 26 is carried on the other side by means of an upper press section 38, also so that it is movable in the longitudinal direction 34. In the step shown in FIG. 1, the mandrel 26 is sliding with its larger diameter section 30 against the sliding surface of the flange-bearing bushing 6.

Figure 2:
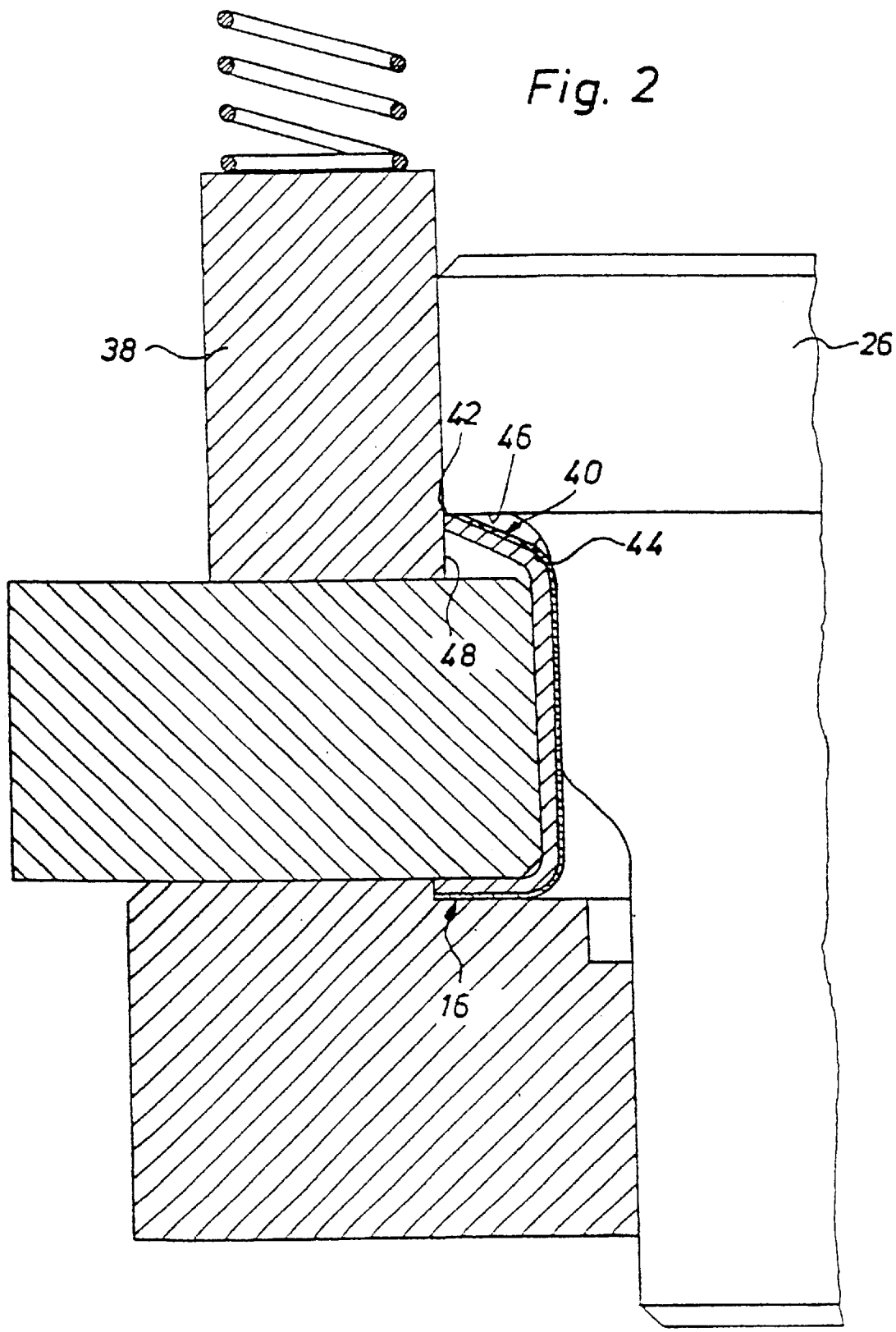
Figure 3:
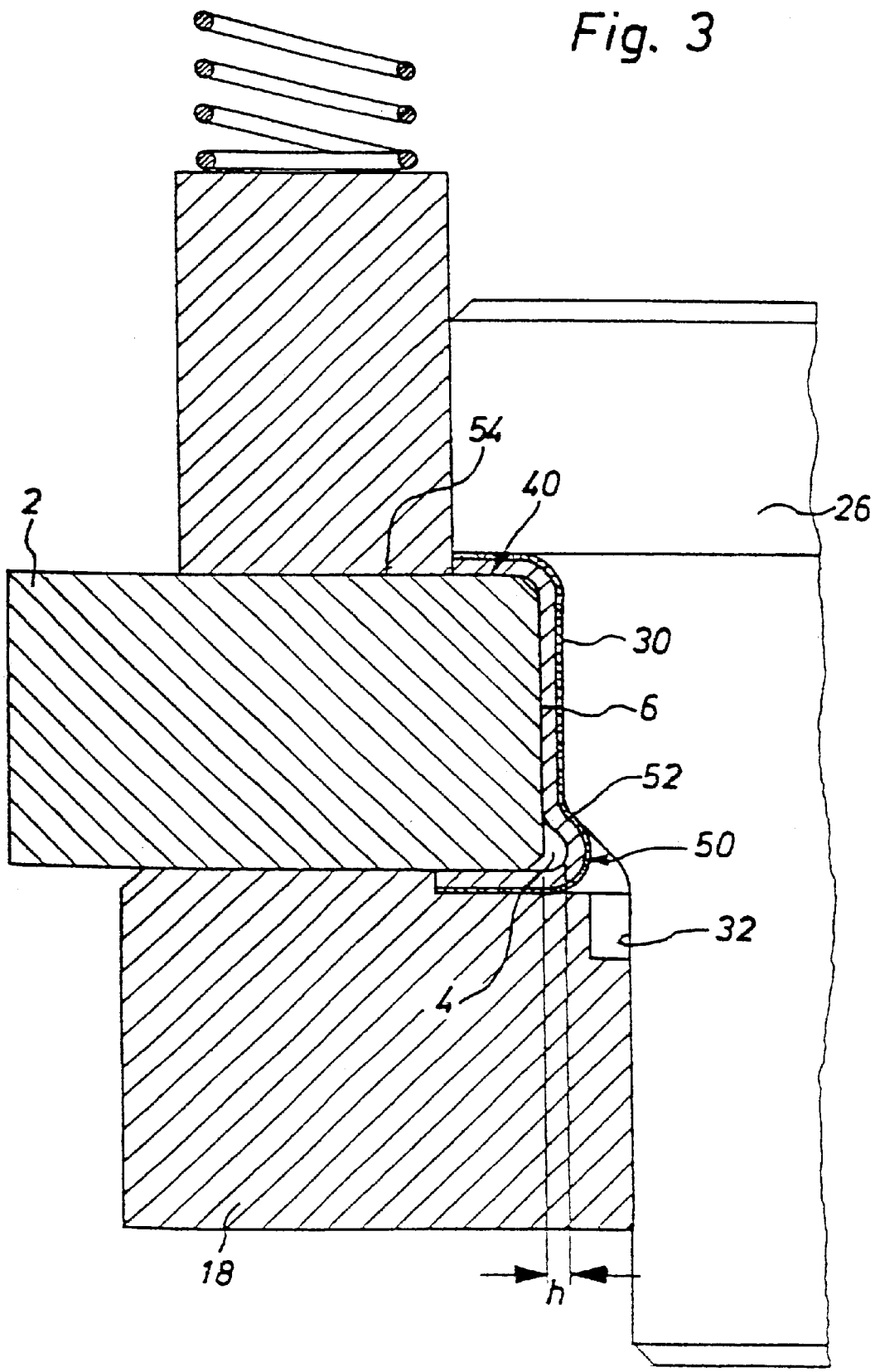

As can be seen from FIG. 2, which shows a subsequent step in the process, a second flange 40 is formed on the side opposite the flange 16, specifically in a way such that the end face 42 of the cylindrical part 14 of the flange-bearing bushing away from the flange 16 slides against a rounded transition 44 between the larger diameter section 30 of the outer surface 28 of the mandrel 26 and a press surface 46 of the mandrel 26 running parallel to the flange plane and is formed over to the outside around the radius. Finally, the end face 42 contacts a radial outside stop 48 of the upper press section 38. As the mandrel is inserted further, the wall of the flange-bearing bushing is upset, pressed and pushed in the longitudinal direction, and the crimped projection 50 is formed radially inward, which can be seen in FIG. 3. This crimped projection 50 is formed by a curved profile of the wall of the flange-bearing bushing 6, which is created in the transition from the larger diameter section 30 to the smaller diameter section 32 of the mandrel 26. This situation is shown in FIG. 3. The curved profile 52 creates an clearance h of 0.01–1 mm, preferably 0.02–1 mm, between the bearing opening 4 and the outside of the flange-bearing bushing wall 6. FIG. 3 also shows the final position of the mandrel 26 with respect to the die press 18 and the hinge housing component 2. The second flange 40 of the flange-bearing bushing 6 is formed and lies against the surface 54 of the hinge housing component 2 which is opposite the surface 22. The mandrel is now withdrawn from the flange-bearing bushing 6, and the flange-bearing bushing 6 is assembled in the bearing opening of the hinge housing component 2.

Figure 4:
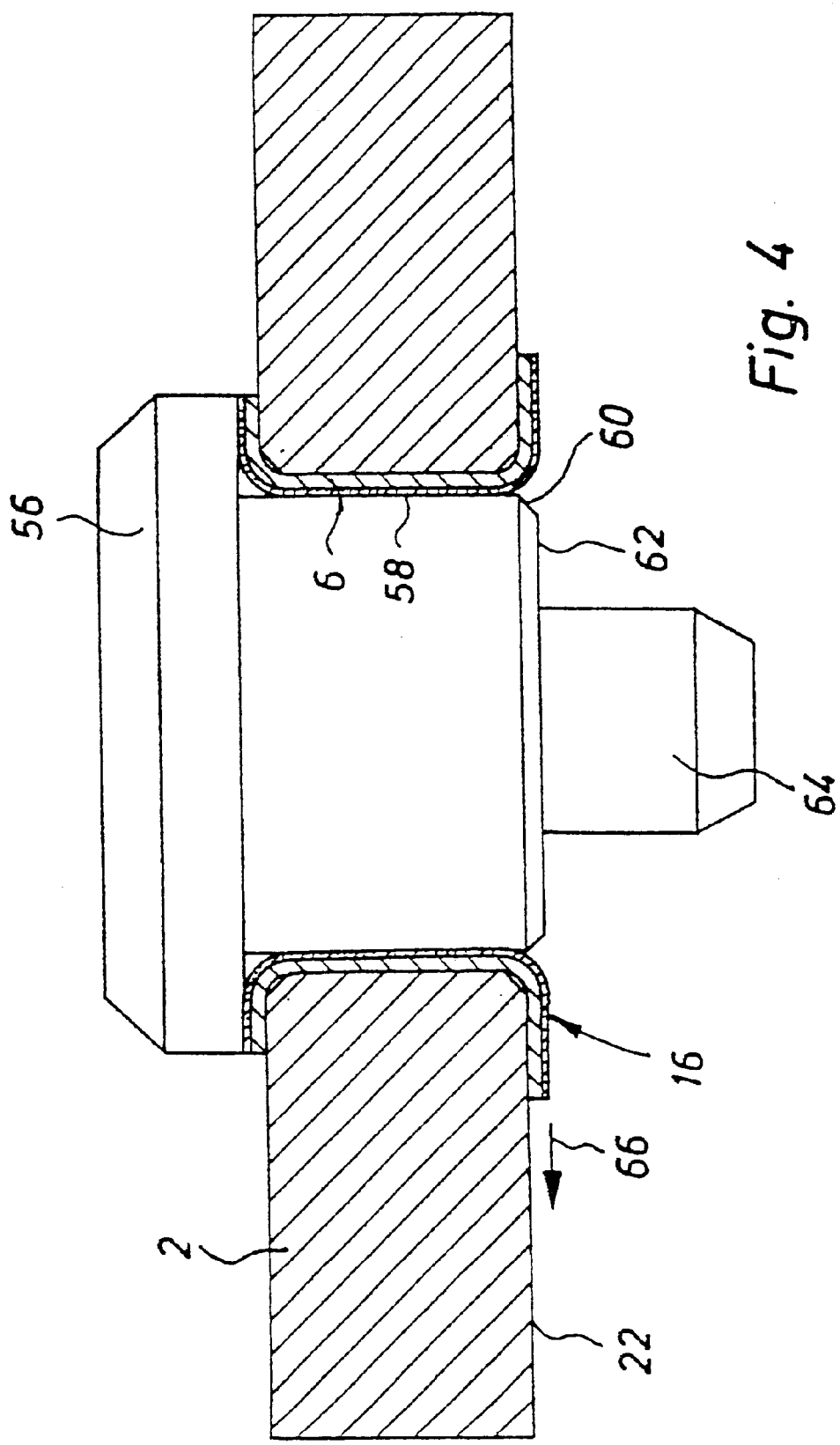

Now, as shown in FIG. 4, a bearing pin 56 can be inserted into the flange-bearing bushing 6. The bearing pin 56 comprises a cylindrical outer surface 58 with a leading chamfer 60 in the direction of insertion, which changes to a front face 62. An assembly section 64, which can be tightened down to another hinge housing component or object, protrudes from the front face 62. FIG. 4 shows the bearing pin 56 in its inserted position. As the bearing pin 56 is inserted, its chamfered area 60 slides up over the crimped projection 50 and expands the curved profile 52 outward in a radial direction. The crimped projection 50, as it is shown in FIG. 3, is elastically deformable outward around the radius. In the process, the first flange 16, with its steel backing lying against the surface 22 of the hinge housing component 2, slides outward in a radial direction (arrow 66 in FIG. 4) against this surface 22. The curved area 52 then lies once more basically clearance-free against the wall of the bearing opening 4 of the hinge housing component 2. As a result of the elastic pinch-fit force of the previously crimped projection 50, which cannot be seen in FIG. 4 but which still exists directed inward around the radius, the bearing pin 56 is a pinch fit in the flange-bearing bushing 6 and in normal handling is held captive.

What is claimed is:

1. A slide bearing comparing a hinge housing component having a bearing opening and a flange-bearing bushing pressed into the bearing opening, into which a bearing pin can be inserted and pivoted therein, where the flange-bearing bushing has a crimped projection around the periphery projecting radially inwards, characterized in that the crimped projection is formed by a curved area of the flange-bearing bushing wall in the area of one axial end of the bearing opening when viewed in the longitudinal cross section of the bushing, and the curved area terminates in the flange of the bushing, such that, prior to the insertion of the bearing pin a clearance is created between the bearing opening and the outside of the flange-bearing bushing facing it in the area of the curved profile and the curved area of the flange-bearing bushing can be deformed outwards in the radial direction.

2. The slide bearing in accordance with claim 1, wherein the flange-bearing bushing is a double-flange bushing.

3. The slide bearing in accordance with claim 1, wherein one flange of the flange-bearing bushing is located such that it slides against a area of the hinge housing component surrounding the bearing opening, so that the flange, when a bearing pin is installed into the flange-bearing bushing and with the accompanying radial expansion of the crimped projection, slides radially towards the outside.

4. The slide bearing in accordance with claim 3, wherein the crimped projection protrudes beyond the radial inner bearing surface by 0.01–0.1 mm.

5. The slide bearing in accordance with claim 3, wherein a radial projection of the crimped projection above the radial inner bearing surface amounts to 0.01–0.15 times the thickness of the wall thickness of the flanged-bearing bushing.

6. The slide bearing in accordance with claim 1, wherein a bearing pin is inserted into the flange-bearing bushing which is a pinch fit in the flange-bearing bushing and held captive as the result of the radial expansion of the crimped projection.

* * * * *